July 22, 1958 E. A. WESTMAN 2,844,233
WINDOW FRAME ASSEMBLY
Filed Aug. 19, 1954 2 Sheets-Sheet 1
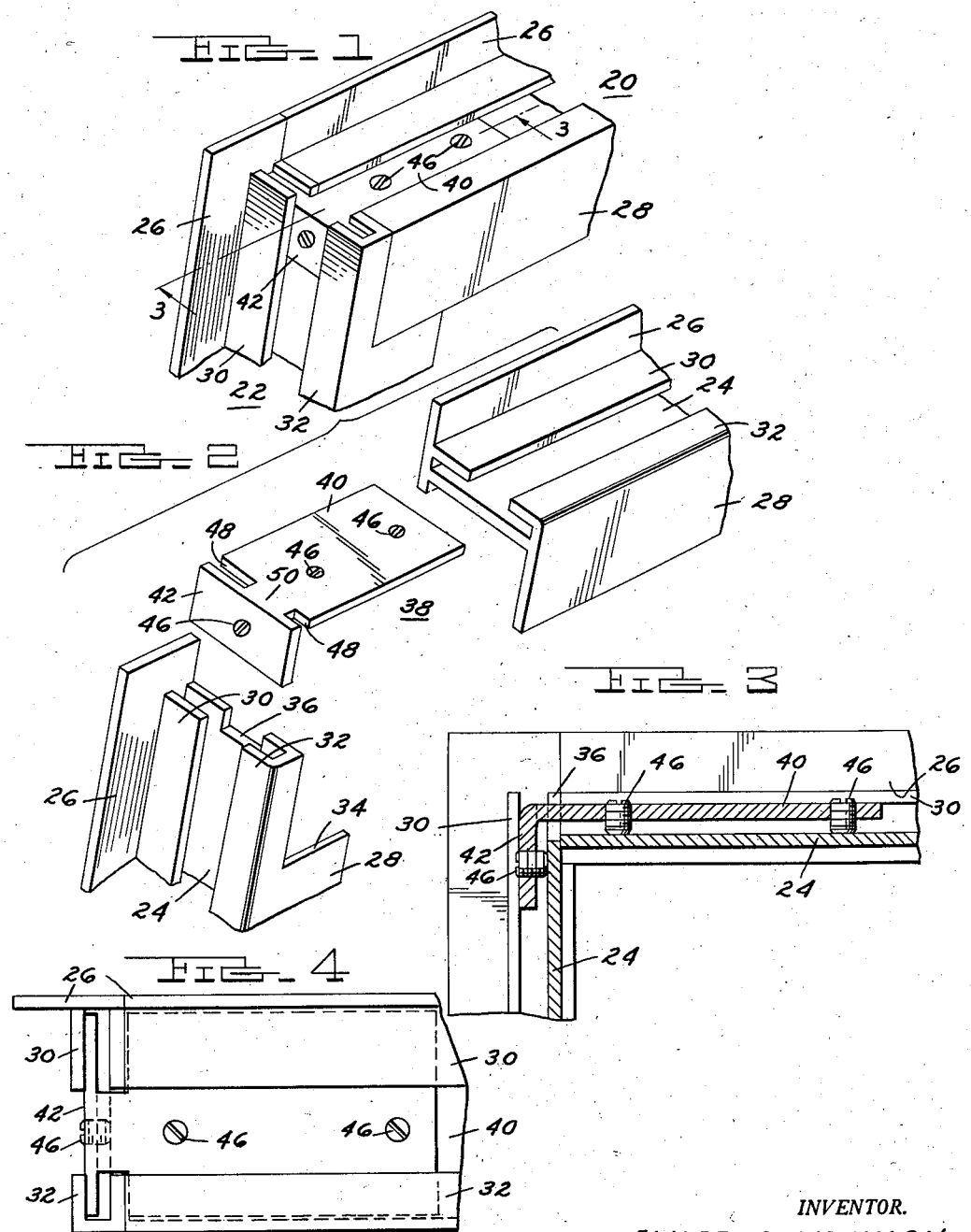
INVENTOR.
ELMER A. WESTMAN
BY
Burton & Parker
ATTORNEYS July 22, 1958　　E. A. WESTMAN　　2,844,233
WINDOW FRAME ASSEMBLY
Filed Aug. 19, 1954　　2 Sheets-Sheet 2
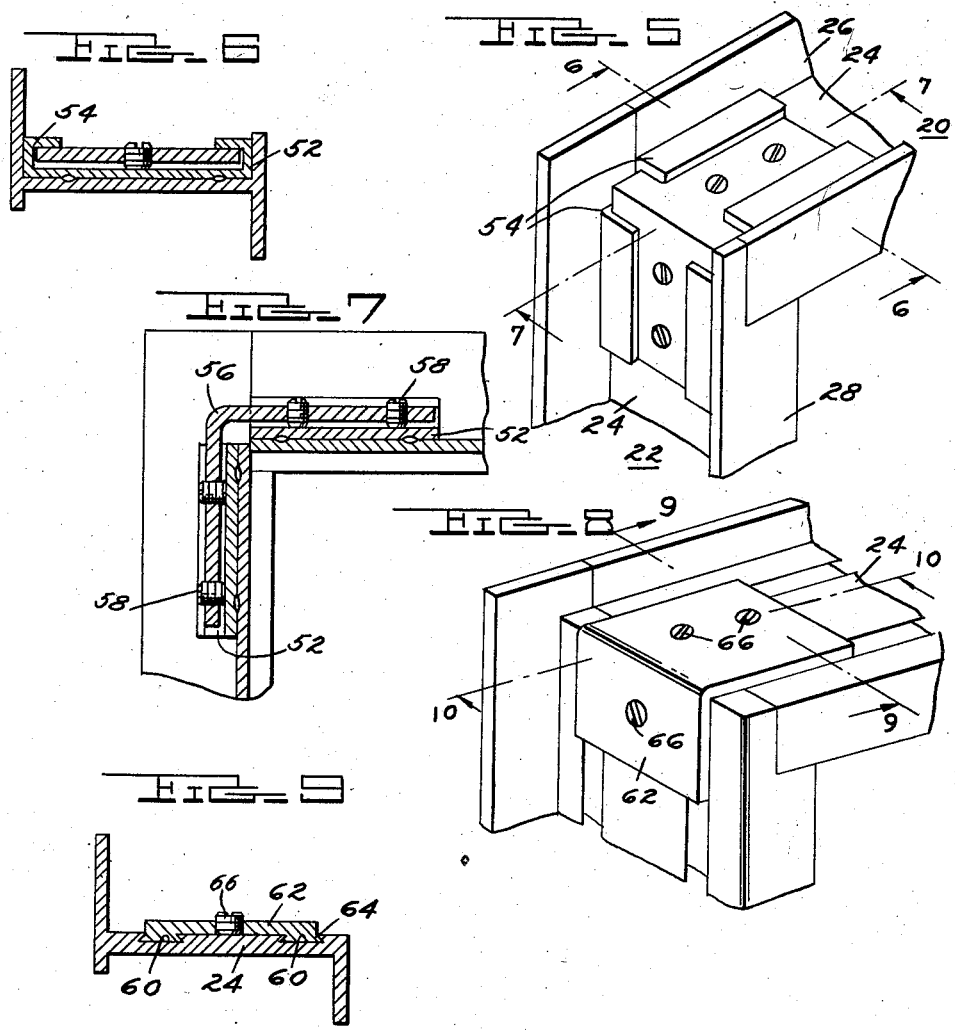
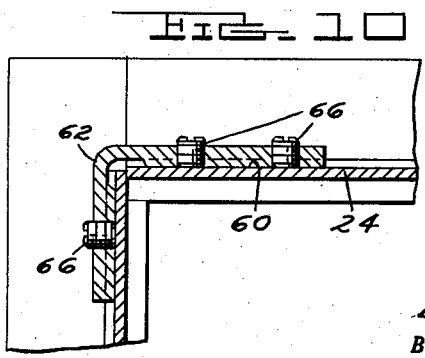
INVENTOR.
ELMER A. WESTMAN
BY
Burton & Parker
ATTORNEYS

2,844,233
Patented July 22, 1958

2,844,233
WINDOW FRAME ASSEMBLY

Elmer A. Westman, Fenton, Mich., assignor, by mesne assignments, to Valley Metal Products Co., Plainwell, Mich., a corporation of Michigan Application August 19, 1954, Serial No. 451,006

1 Claim. (Cl. 189—36)

This invention relates to an improved window frame assembly and particularly to a metal window frame assembly. It relates specifically to the corner connection of a metal window frame.

Metal window frames have heretofore been secured together at the corners by welding, brazing, or the like. Screws have been used along with angular plates connected to the window frame members to form a rigid and secure corner connection.

An object of my invention is to provide a corner connection for metal window frame members which is simple, easily attached to the frame members, and provides a rugged, strong corner connection.

Another object is the provision of a corner connection for a window frame which is so constructed and adapted to be secured to the frame members as to require only a minimum of work and tools to accomplish the connection. The construction is such that the window frame members may present a uniform cross sectional shape. They may be sold as long length aluminum extrusions and cut off in the field to the desired window dimension. Corner pieces are provided which are adapted to be quickly and readily attached to the ends of the frame members at the corners to form a strong corner construction.

More particularly the invention comprises a corner construction wherein the window frame members are generally Z-shaped in cross section. The intermediate part of the Z shape is substantially perpendicular to the end parts thereof. This intermediate part of the Z shape is provided at each of the abutting ends which form the corner outwardly of the intermediate part with a channel portion having overhanging side walls. A corner section is provided for each corner of the window frame. This corner section is angular in shape. It is adapted to overlie the corner of the frame and the end portions of the frame section. It directly overlies the intermediate parts of the Z sections and is received within the channel portions thereof. Means are secured to these corner pieces which engage the intermediate parts of the frame members securely holding the corner pieces thereto to form a strong corner for the window frame.

More specifically the channel portions disposed outwardly of the window frame members at the corners may comprise integral parts of the frame members or they may be parts which are assembled and secured thereto. The corner pieces which are disposed within the channel portions to connect the frame members together are designed to be readily received in place and to be quickly attached to the frame members and without any drilling or cutting of the frame members to accomplish such attachment. Different modifications of the constructions, all within the scope of the invention, are hereinafter described.

Other objects, advantages, and meritorious features will more particularly appear from the following specification, claim, and accompanying drawings, wherein:

Fig. 1 is a perspective and a preferred form of my invention embodied in a corner part of a window frame;

Fig. 2 is a perspective showing the portion appearing in Fig. 1 separated from one another;

Fig. 3 is a cross sectional view taken on the line 3—3 of Fig. 1;

Fig. 4 is a plan view looking down on the construction shown in Fig. 1;

Fig. 5 is a perspective similar in disposition and fragment of structure to that shown in Fig. 1 but illustrating a modified form of construction;

Fig. 6 is a cross sectional view taken on the line 6—6 of Fig. 5;

Fig. 7 is a cross sectional view taken on the line 7—7 of Fig. 5;

Fig. 8 is a perspective of a fragment of a similar character to that shown in Figs. 1 and 5 but illustrating a modified form of structure;

Fig. 9 is a cross sectional view taken on the line 9—9 of Fig. 8;

Fig. 10 is a cross sectional view taken on the line 10—10 of Fig. 8.

The preferred form of the invention which is illustrated in Figs. 1–4 illustrates window frame members of the same cross sectional configuration in use as the header member 20 and the jamb member 22. Each such member is shown in Fig. 2 separately and is shown as comprising a shape which is that generally of the letter Z but wherein the intermediate portion of the Z shape indicated as 24 is disposed substantially perpendicularly with respect to the top and bottom portions 26 and 28. The portion 26, as does the portion 28, projects in both directions perpendicularly away from the intermediate part 24. The major portion of the projection of the part 26 away from the intermediate part 24 is in the opposite direction from that of part 28. These sections may be aluminum extrusions in long lengths. They may be cut at the factory to the length desired and there assembled into a complete window frame. They may be cut at the factory and shipped as separate parts along with corner pieces to the field where they may be there assembled. They may be shipped in long lengths to the field and there cut and assembled with corner pieces. The construction lends itself to this diversity of fabrication.

Each frame member or Z-shaped section exhibits on the outer face spaced from the intermediate part a channel arrangement. This channel arrangement is formed by a pair of flanges 30 and 32 which project inwardly toward each other from the parts 26 and 28. These flanges project inwardly parallel to the intermediate part 24 spaced therefrom. They terminate spaced from each other as shown in Figs. 1 and 2.

In the assembly shown in Figs. 1–4 the header section of the window frame is shown as cut off square at the end but the jamb section is shown as having its part 28 cut away providing a notch 34. The intermediate part of such jamb section is shown as notched at the end as at 36. A right angular corner piece is indicated as 38. This corner piece has one leg 40 which is received as shown in Figs. 1 and 2 to overlie the intermediate part 24 of the header. It has a second leg 42 which is adapted to overlie the intermediate part 24 of the adjacent jamb member. These legs are received underneath the flanges 30 and 32 as shown in Figs. 1, 3, and 4. Screws 46 are threaded through the legs 40 and 42 of the corner piece. These screws are adapted as shown in Fig. 3 to bear against the intermediate part 24 of the Z-shaped sections and urge the legs of the corner piece toward the overhanging flanges 30 and 32 tensioning the same thereagainst to draw the frame members tightly together at the corner and to hold them securely together at such point.

This corner piece 38 is shown as having its leg 40 notched inwardly from opposite sides as at 48. These notches form a narrow neck portion 50. This neck portion 50 of the corner piece is received within the notch 36 of the jamb member and the notches 48 receive as shown portions of the intermediate part 24 formed by the notch 36. This is shown in Figs. 1, 3, and 4.

The flanges 30 and 32 extend for the full length of the frame members for this is an extrusion piece. This construction just described forms a peculiarly rigid and strong one.

In Figs. 5, 6, and 7 is illustrated a modified form of construction. The frame members are similarly identified as 20 and 22. They are generally Z-shaped in cross section as heretofore described and comprise an intermediate part of the Z which extends between end portions 26 and 28, all as hereinabove set forth. These frame members, however, do not exhibit the flanges 30 and 32 as integral parts of an extruded strip. Each of these frame members is provided adjacent to its abutting ends with a channel-shaped member 52. This is a short channel-shaped member and it is secured to the outer face of the intermediate face 34 by welding or the like, all as shown in Figs. 6 and 7. This channel-shaped member 52 is provided with side walls which exhibit overhanging flanges 54 and a corner piece 56 has its legs received within these channel members as shown in Figs. 5, 6, and 7. Each of these two legs is provided with screws 58 which serve the same purpose as the screws 46 in the construction hereinabove described. The corner pieces are readily applied to the frame members and the screws threaded down to provide a secure corner connection.

Figs. 8, 9, and 10 illustrate a second modified form. The frame members are generally of the same configuration. They may be extruded sections which are generally Z-shaped in cross section. The intermediate part of each of these sections will be formed somewhat heavier than the intermediate portion of structures hereinabove described and each intermediate part which is indicated by the numeral 24 is cut away to exhibit a pair of parallel channels 60. These channels are keystone shaped in cross section as shown particularly in Fig. 9.

The corner piece indicated as 62 is of the same general character hereinabove set forth but each leg of the corner piece is provided on its inner surface with ribs which are keystone shaped in cross section to be received within the keystone shaped channels of the frame members. These ribs are indicated by the numeral 64. The structure is shown assembled in Figs. 8, 9, and 10. Each corner piece is provided with two screws 66 threaded therethrough and adapted to bear against the intermediate part 24 of the Z-shaped section to exert a tension thereon to hold the ribs securely within the channel. This provides a strong and rugged corner construction.

What I claim is:

In a window frame connection, the combination including a pair of window frame members disposed in angular relationship with the ends thereof in abutment and forming a right angular corner, each of said members being generally Z-shaped in cross section with the intermediate part of the Z shape disposed substantially perpendicularly with respect to the two end parts thereof, the intermediate part of each Z shape adjacent to its abutting ends provided on its outer face with an outwardly open channel having side walls provided with opposed complementary overhanging parts which overhang the intermediate part of the Z shape, an angular corner piece overlying the abutting ends of said members, said corner piece being provided with angularly disposed leg portions disposed within the channels of the members and resting directly upon the intermediate parts of the Z shapes underneath the overhanging portion of the side walls of the channels, and screw means extending through each of said leg portions between the overhanging parts of the side walls and bearing against the bottom of the channel so as to force said leg portions into frictional engagement with the overhanging parts of the side walls of the channels, one leg portion of the corner piece being provided with opposed complementary notches extending inwardly from the edges of the leg portion and forming a reduced neck portion adjacent to the other leg portion of the corner piece, the intermediate part of the Z shape of the frame member overlaid by said other leg portion of the corner piece being notched inwardly from its end and receiving within said notch the reduced neck of the first mentioned leg portion of the corner piece.

References Cited in the file of this patent

UNITED STATES PATENTS

| | | |
|---|---|---|
| 2,451,076 | Edwards | Oct. 12, 1948 |
| 2,654,451 | Schmidgall | Oct. 6, 1953 |
| 2,666,508 | Nardulli | Jan. 19, 1954 |
| 2,717,667 | Bancroft | Sept. 13, 1955 |